United States Patent
Myers et al.

(10) Patent No.: US 12,181,901 B2
(45) Date of Patent: Dec. 31, 2024

(54) AUTOMATED TANK SYSTEMS AND METHODS FOR USE IN OIL AND GAS EXTRACTION OPERATION

(71) Applicant: Ideal Completion Services LLC, Calgary (CA)

(72) Inventors: Jeremy Myers, Calgary (CA); Glenn Doiron, Calgary (CA); Richard Defreitas, Calgary (CA)

(73) Assignee: Ideal Completion Services LLC, Tulsa, OK (US)

( * ) Notice: Subject to any disclaimer, the term of this patent is extended or adjusted under 35 U.S.C. 154(b) by 0 days.

(21) Appl. No.: 17/453,234

(22) Filed: Nov. 2, 2021

(65) Prior Publication Data

US 2022/0137650 A1    May 5, 2022

Related U.S. Application Data

(60) Provisional application No. 63/109,313, filed on Nov. 3, 2020.

(51) Int. Cl.
*G05D 9/12*    (2006.01)
*G01F 23/18*   (2006.01)

(52) U.S. Cl.
CPC ............ *G05D 9/12* (2013.01); *G01F 23/18* (2013.01)

(58) Field of Classification Search
CPC ......... Y10T 137/4807; Y10T 137/7303; Y10T 137/7306; Y10T 137/731; Y10T 137/7501; Y10T 137/7498; Y10T 137/8326; Y10T 137/8342; G05D 9/12; G01F 15/005; G01F 23/14; G01F 23/18; G01F 23/80;
(Continued)

(56) References Cited

U.S. PATENT DOCUMENTS 3,855,103 A * 12/1974 McLaren ............... C10G 31/08
                                                  204/662
3,992,941 A * 11/1976 McGoldrick ........... G01F 23/68
                                                  340/623
(Continued)

FOREIGN PATENT DOCUMENTS

DE        10248694 B3 *  4/2004  ............. B65D 90/48
WO   WO-2012170772 A1 * 12/2012  ............... G05D 9/12
WO   WO-2016183125 A1 * 11/2016  ............. B01D 19/00

OTHER PUBLICATIONS

Machine English Translation of DE10248694 (Year: 2024).*

*Primary Examiner* — Hailey K. Do
(74) *Attorney, Agent, or Firm* — AVEK IP, LLC

(57) ABSTRACT

A method of storing fluid from an oil well includes the steps: providing storage tanks; providing a diversion tank; coupling a fill manifold to the storage tanks and to the diversion tank, the fill manifold having a first control valve controlling flow of the fluid to the storage tanks, the fill manifold having a second control valve controlling flow of the fluid to the diversion tank; associating a sensor with at least one of the storage tanks without accessing a top of any of the storage tanks, the sensor being configured to determine a volume of the fluid within at least one of the storage tanks; associating a control system with the fill manifold and the sensor; and actuating the first and second control valves using the control system in response to at least one detection by the sensor to ensure that the storage tanks are not overfilled.

17 Claims, 4 Drawing Sheets

(58) Field of Classification Search
CPC ....... G01F 23/20; B65D 90/626; B65D 90/48; F16K 37/0075; F16K 37/0091
See application file for complete search history.

(56) References Cited

U.S. PATENT DOCUMENTS

| | | | | | |
|---|---|---|---|---|---|
| 4,190,072 | A | * | 2/1980 | Fernandez | B65G 5/00 405/59 |
| 4,233,922 | A | * | 11/1980 | Conway | B63B 25/12 220/749 |
| 4,292,909 | A | * | 10/1981 | Conway | B63B 25/08 114/74 R |
| 4,446,804 | A | * | 5/1984 | Kristiansen | B63B 27/24 137/263 |
| 4,807,672 | A | * | 2/1989 | Sherk | G01F 23/14 340/617 |
| 4,865,073 | A | * | 9/1989 | Kocher | H01H 36/02 137/429 |
| 5,333,498 | A | * | 8/1994 | Brackett | B67D 7/08 73/304 R |
| 5,615,702 | A | * | 4/1997 | Dawans | B60K 15/07 137/259 |
| 6,314,978 | B1 | * | 11/2001 | Lanning | B64G 1/402 137/256 |
| 9,895,630 | B2 | * | 2/2018 | Adler | G05D 9/12 |
| 9,963,961 | B2 | * | 5/2018 | Hardin | G05D 9/12 |
| 10,152,066 | B2 | * | 12/2018 | Oh | G05D 9/12 |
| 2015/0034176 | A1 | * | 2/2015 | Garcia Arguelles | E03F 1/007 137/391 |
| 2015/0052997 | A1 | * | 2/2015 | Schlachter | G01F 23/14 73/299 |
| 2019/0271580 | A1 | | 9/2019 | Sheridan | |
| 2020/0236879 | A1 | * | 7/2020 | Millar | A01G 27/008 |

* cited by examiner

AUTOMATED TANK SYSTEMS AND METHODS FOR USE IN OIL AND GAS EXTRACTION OPERATION

RELATED APPLICATIONS

This application claims priority to U.S. Patent Application 63/109,313 filed Nov. 3, 2020, which is incorporated by reference in its entirety herein.

FIELD OF THE DISCLOSURE

The disclosure relates generally to the field of oil and gas extraction. More particularly, the disclosure relates to tank systems and methods for use in oil and gas extraction operations.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to an embodiment, an automated tank system for use in oil and gas extraction operations includes a plurality of storage tanks for use in oil and gas extraction operations, a diversion tank, a fill manifold, a sensor external to the plurality of storage tanks, and a control unit. The fill manifold has a first control valve operably coupled to the plurality of storage tanks and a second control valve operably coupled to the diversion tank. The sensor is configured to determine a volume of fluid within at least one of the plurality of storage tanks. The control unit selectively actuates the first control valve and the second control valve in response to at least one detection by the sensor.

According to another embodiment, a method of storing fluid from an oil well includes the steps: providing a plurality of storage tanks; providing a diversion tank; coupling a fill manifold to the plurality of storage tanks and to the diversion tank, the fill manifold having a first control valve controlling flow of the fluid to the plurality of storage tanks, the fill manifold having a second control valve controlling flow of the fluid to the diversion tank; associating a sensor with at least one of the storage tanks without accessing a top of any said storage tank, the sensor being configured to determine a volume of the fluid within at least one of the storage tanks; associating a control system with the fill manifold and the sensor; and actuating the first and second control valves using the control system in response to at least one detection by the sensor to ensure that the storage tanks are not overfilled.

DETAILED DESCRIPTION

Figure 1:
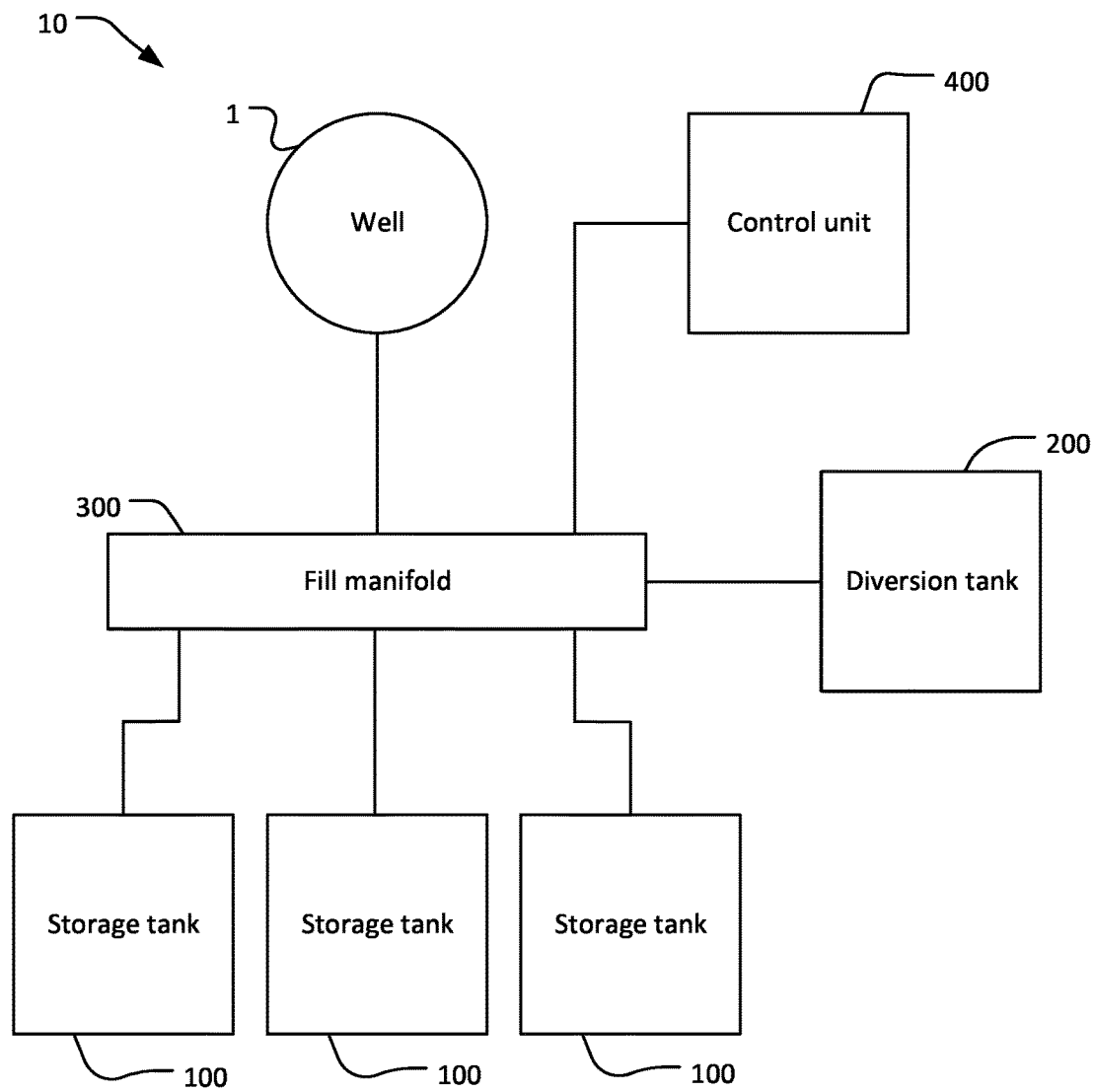
FIG. 1 is a block diagram of an automated tank system, according to an embodiment of the present disclosure.

Storage tanks are ubiquitous on sites where oil and gas is extracted. Managing those tanks and the flow to and from those tanks can be a problem. And in some legacy systems, personnel must install equipment into a tank through the tank's top—which can be dangerous and/or require special equipment to provide appropriate access. Those and/or other problems may be addressed by various embodiments of the current invention.

An automated tank system 10 for use with one or more well 1 (e.g., an oil and/or natural gas well) is shown in FIGS. 1 through 4 and broadly includes a plurality of storage tanks 100, a diversion tank 200, a fill manifold 300, and a control unit 400. The control unit 400 may make use of a computing system 500. In operation, the fill manifold 300 of the system 10 may be configured to direct fluid (e.g., gas, water, oil, a combination thereof, etc.) to one or more of the plurality of storage tanks 100 while monitoring one or more conditions of the storage tanks 100. The conditions monitored may be, for example, pressure of the storage tanks 100, filled volume of the storage tanks 100, flow rate of fluid to the storage tanks 100, et cetera. When the plurality of storage tanks 100 have been determined to have reached a certain capacity (i.e., an "overflow scenario"), the fill manifold 300 may redirect the fluid flow from the storage tanks 100 to the diversion tank 200. The point at which this occurs may be, for example, a predetermined value set by an operator. In this way, storage tank 100 spilling, overflow, and/or over-pressurizing may be mitigated or avoided, by diverting the remaining fluid flow to the diversion tank 200.

The plurality (e.g., three or any other desirable number) of primary storage tanks 100 may act together as a main reservoir for the fluid flow from the well 1. Generally, each of the plurality of storage tanks 100 may be filled by the fill manifold 300 at approximately the same rate. The storage tanks 100 may include, for example, a plurality of 400 BBL tanks. Standard 400 BBL tanks may be about twelve feet in diameter and twenty feet in height, and are typically made of materials such as steel. A standard 400 BBL storage tank may have a fluid capacity of about 19,800 gallons. Each of the plurality of storage tanks 100 may be the same type of tank, though in embodiments at least one storage tank 100 differs from another storage tank 100.

These storage tanks 100 may fill with fluids such as water (e.g., water produced from oil and gas production operations) that originate from the well 1 and are routed via the fill manifold 300 and one or more storage tank lines 125 (e.g., pipes, tubes, conduits for oil/gas transference, et cetera). Minor amounts of light liquid gas condensate may also be included in this fluid flow. It will be understood that any suitable storage tank for oil and gas operations may alternately be used as the primary storage tanks 100, such as 500 BBL tanks. Tank type and tank capacity may be preselected by a user, and the control unit 400 may modify the behavior of the automated tank system 10 according to this selection, as will be described in greater detail below.

The diversion tank 200 may be the same type or a similar type of storage tank as the plurality of storage tanks 100. Also like the plurality of storage tanks 100, the diversion tank 200 may be selectively coupled to the well 1 via the fluid manifold 300. During regular operation, the diversion tank 200 may not receive the fluid flow from the well 1. However, when an overflow scenario is detected, the fill manifold 300 may cease fluid flow to the storage tanks 100, and instead direct the fluid flow through the diversion tank lines 225 to the diversion tank 200. In operation, the diversion tank 200 may be used to accept (e.g., temporarily) the fluid flow of the well 1 in situations where the plurality of storage tanks 100 are at or near capacity. This way, danger to the tanks, the worksite, and/or nearby personnel may be avoided by ceasing flow to the plurality of storage tanks 100 and instead filling the diversion tank 200. It is to be understood that the diversion tank 200 may comprise more than one tank per plurality of storage tanks 100. However, in embodiments, there may be multiple pluralities of storage tanks 100 per diversion tank 200.

Figure 2:
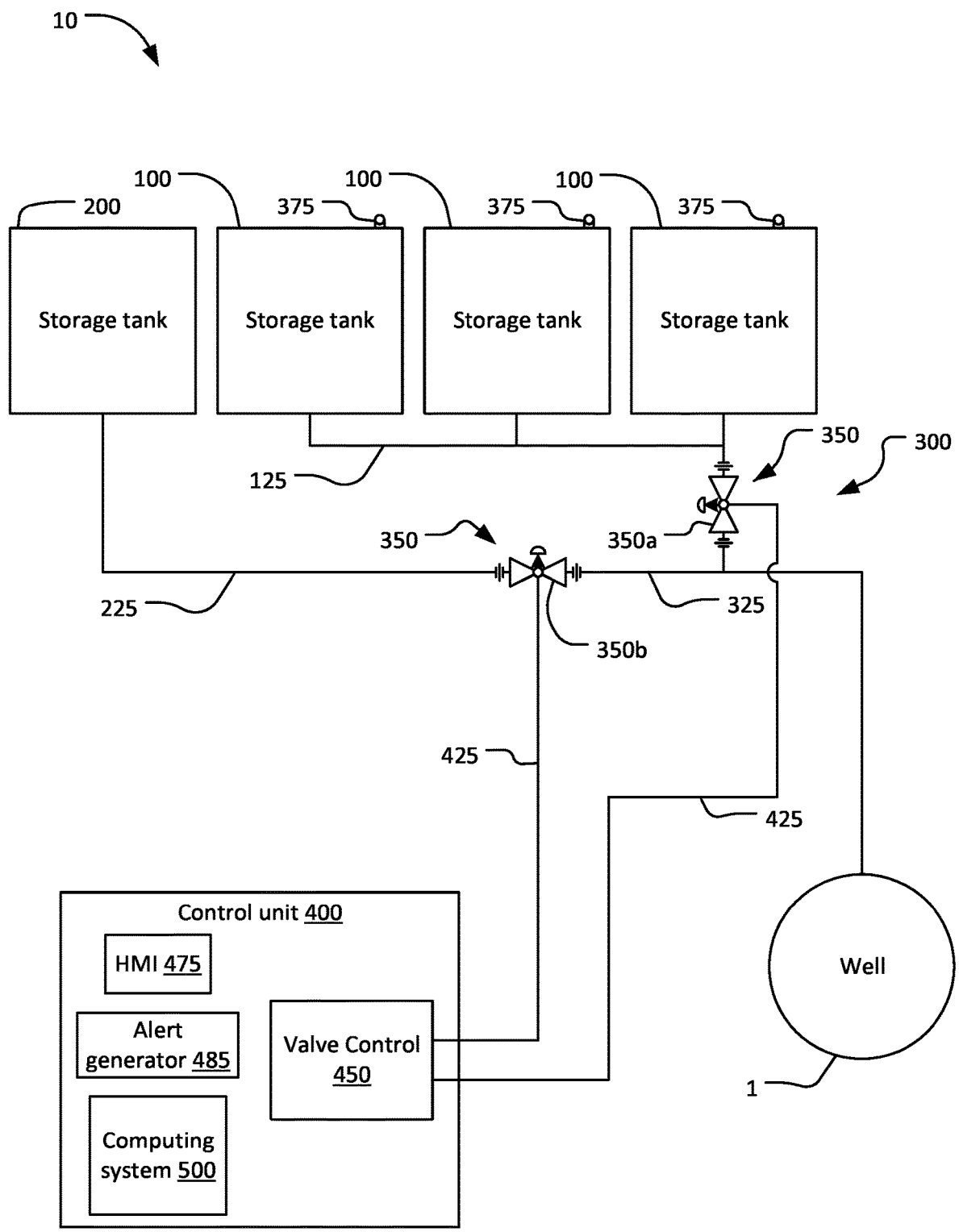
FIG. 2 is a block diagram detailing a fill manifold of the automated tank system of FIG. 1.

The fluid manifold 300 may comprise manifold lines 325, control valves 350, and sensors 375, as depicted in FIG. 2. The manifold lines 325 may selectively route the fluid from the well 1 through the storage lines 125 and/or the diversion lines 225 via the control valves 350. The control valves 350 may comprise one or more of any suitable type of valve for selectively controlling a fluid, now known or subsequently developed. For example, the control valves 350 may include one or more butterfly valves located between the manifold lines 325 and each of the storage lines 125 and the diversion lines 325. During regular operation, the butterfly valves 350 may permit fluid flow through the storage lines 125 to the storage tanks 100, while precluding fluid flow through the diversion lines 225 to the diversion tank 200. When an overflow scenario is determined (e.g., detected by the sensors 375), the butterfly valves 350 may instead preclude the fluid flow to the storage tanks 100 and permit the fluid flow to the diversion tank 200. In embodiments, the control valves 350 may include additional valves, such as a plurality of ball valves along the storage lines 125 and/or the diversion lines 225. These additional valves may act as fail safes or backups in the cases where the main valves 350 were to fail or malfunction in some manner.

In some embodiments, one or more of the control valves 350 (e.g., the control valve 350a associated with the storage tanks 100) may have associated therewith at least one sensor 375 (e.g., a flowmeter). But it may be particularly desirable for the sensor 375 to instead be incorporated elsewhere, such as through an NPT coupler or other appropriate fitting—preferably near a bottom of the storage tank 100. The sensors 375 may in turn be communicatively linked (e.g., wired, wirelessly) to the control unit 400 for the exchange of information therebetween. The sensor 375 may detect a characteristic of the fluid that is flowing into the storage tank 100. For example, the sensor 375 may be a pressure-based level sender calibrated to the density of the fluid being stored, that may detect a pressure of the fluid housed within the storage tanks 100. Using this pressure reading, the volume of fluid in one or more of the tanks 100 may be determined (e.g., by calculating with the known and/or measured density of the fluid). Readings from these sensors 375 may be used to influence control valve 350 function. For example, the sensors 375 may direct their readings to the control unit 400, where the readings may be evaluated, and action may be taken in response. If the readings fall within a given range (e.g., a predetermined range), such as within overflow conditions, then the control unit 400 may signal the control valves 350 to actuate and divert the fluid flow to the diversion tank 200.

In some embodiments, there is a single butterfly valve 350a selectively restricting fluid flow to the storage tanks 100. As such, each of the storage tanks 100 may be filled at roughly the same rate via the fluid flowing through the one butterfly valve 350. In this way, a sensor 375 reading taken at one storage tank 100 may allow the current capacity of each of the storage tanks 100 to be determined. Where conventional systems typically require a sensor for each individual tank, the automated tank system 10 may instead monitor a plurality of tanks 100 with only one sensor 375.

In some embodiments, the diversion tank 200 may additionally have associated therewith a sensor 375. Using this sensor 375, the current volume of fluid in the diversion tank 200 may be determined at a given time. The control unit 400 may use these readings to determine if the automated tank system 10 has reached a "critical overflow" scenario, where both the storage tanks 100 and the diversion tank 200 have been filled to capacity.

Each of the control valves 350 and sensors 375 may be installed externally to the storage tanks 100 and the diversion tank 200. For example, both a control valve 350 and a sensor 375 may be installed outside one of the storage tanks 100, approximately fourteen inches above the base of that storage tank 100. An external sensor 375 may be advantageous over traditional tank system sensors, where it is required to modify the tank itself to incorporate the sensor. These modifications usually involve replacing a top or other hatch of the conventional tank with a sensing device that extends into the tank. The automated tank system 10 and the sensors 375 may therefore leave the tanks 100 and 200 relatively untouched.

Where the sensor 375 is a pressure level sender, a bias may be needed to be added to the readings of the sensor 375 based on how high the sensor 375 is from the base of the storage tank 100 or diversion tank 200, and based on what kind of tank 100, 200 is being used. For example, for a standard 400 BBL tank, each inch of fluid volume in the tank roughly translates to 1.66 BBL of fluid. Thus, a bias of 23.24 BBL of fluid (i.e., 14 inches×1.66 BBL per inch) may be added to a sensor reading taken by the sensor 375.

Alternately or additionally to pressure sensors 375, the sensors 375 may include level indicators mounted in and/or on the storage tanks 100 and/or the diversion tank 200. The level indicators may directly measure (e.g., with infrared, ultrasound, liquid float, etc.) the level of fluid in the tanks 100 and/or 200. The control valve 350 function may alternately or additionally depend on these level indicator readings (i.e., the level indicators may be used to determine or confirm when an overflow scenario occurs).

The control unit 400 may be, for example, a well site control skid comprising a valve control system 450, a human-machine interface (HMI) 475, an alert generator 485, and a computing system 500. The control unit 400 may have other electronics associated therewith, such as programmable logic control panels. In operation, the control unit 400 may monitor and/or control one or more functions of the automated tank system 10. Via the HMI 475, a user may interact with and modify one or more functions/settings of the automated tank system 10. While FIG. 2 depicts only one set of storage tanks 100, diversion tank 200, and fill manifold 300 in use with the control unit 400, it is to be understood that the control unit 400 may monitor and/or control any suitable number of pluralities of storage tanks 100, diversion tanks 200, and fill manifolds 300.

The valve control system 450 may be operably linked to the one or more control valves via control lines 425. The type of control line 425 may depend on the type of valves 350 used. For instance, the control lines 425 may be pressurized air lines if the control valves 350 are pneumatically actuated, hydraulic fluid lines if the control valves 350 are hydraulically actuated, electric lines if the control valves are electrically/mechanically actuated, et cetera. In operation, the valve control system 450 may dynamically respond to sensor 375 readings by adjusting control valve 350 operation. In response to a detection of an overflow scenario by the sensors 375, the valve control system 450 may adjust the control valves 350 such that the fluid is prevented from flowing into the storage tanks 100 and is instead routed to the diversion tank 200.

It may be particularly desirable for the valves 350 to be pneumatically actuated and for the valve control system 450 to use a 3-way control system including nitrogen air bottles and a single solenoid. The valves 350a and 350b may be operably linked to the control lines 425 and the solenoid such that, when an overflow scenario is detected, the valve 350a is closed and the valve 350b is opened. This may be accomplished by the activation of the single solenoid opening the air bottles and switching the position of each of the valves 350a and 350b.

The HMI 475 of the control unit may indicate automated tank system 10 conditions such as current storage tank 100 fluid volume, rate of fill, estimated time to complete fill, system status, alarm status, current diversion tank 200 fluid volume, et cetera. The user may interact with the HMI 475 to view these conditions, as well adjust the functions, settings, and/or parameters of the automated tank system 10. For example, the user may adjust the volume at which the storage tanks 100 need to be filled to trigger control valve 350 rerouting of the fluid. As another example, the user may enter system 10 parameters such as storage tank 100 size, fluid flow rate, etc., into the control unit 400 to allow the control unit 400 to automatically determine other system 10 functions, such as an estimation of when an overflow scenario would occur given the entered data. The user may also use the HMI 475 to manage one or more alarms of the alarm generator 485.

The alarm (or "alert") generator 485 may include any suitable number, type, and combination of alarms. For example, the alarm generator may include audible alarms (e.g., a siren) as well as visual alarms (e.g., a strobing light of amber or other color, a green solid-state light for each of the storage tanks 100, et cetera). These alarms may be used by the control unit 400 to indicate to users a status and/or change in status of the automated tank system 10 to users. For instance, the alarm generator 485 may have a green light for each of the storage tanks 100, and these lights may switch off or switch to a different color when that storage tank 100 is at or near capacity. The strobing light and a siren may activate when an overflow scenario is detected so that nearby users may be alerted to the diversion of the fluid flow from the storage tanks 100 to the diversion tank 200. The alarm generator 485 may generate other alerts alternately or additionally to the lights/sirens, such by generating text messages, calls, emails, etc., to send to one or more users and which detail the automated tank system 10 status or change in status.

Figure 3:
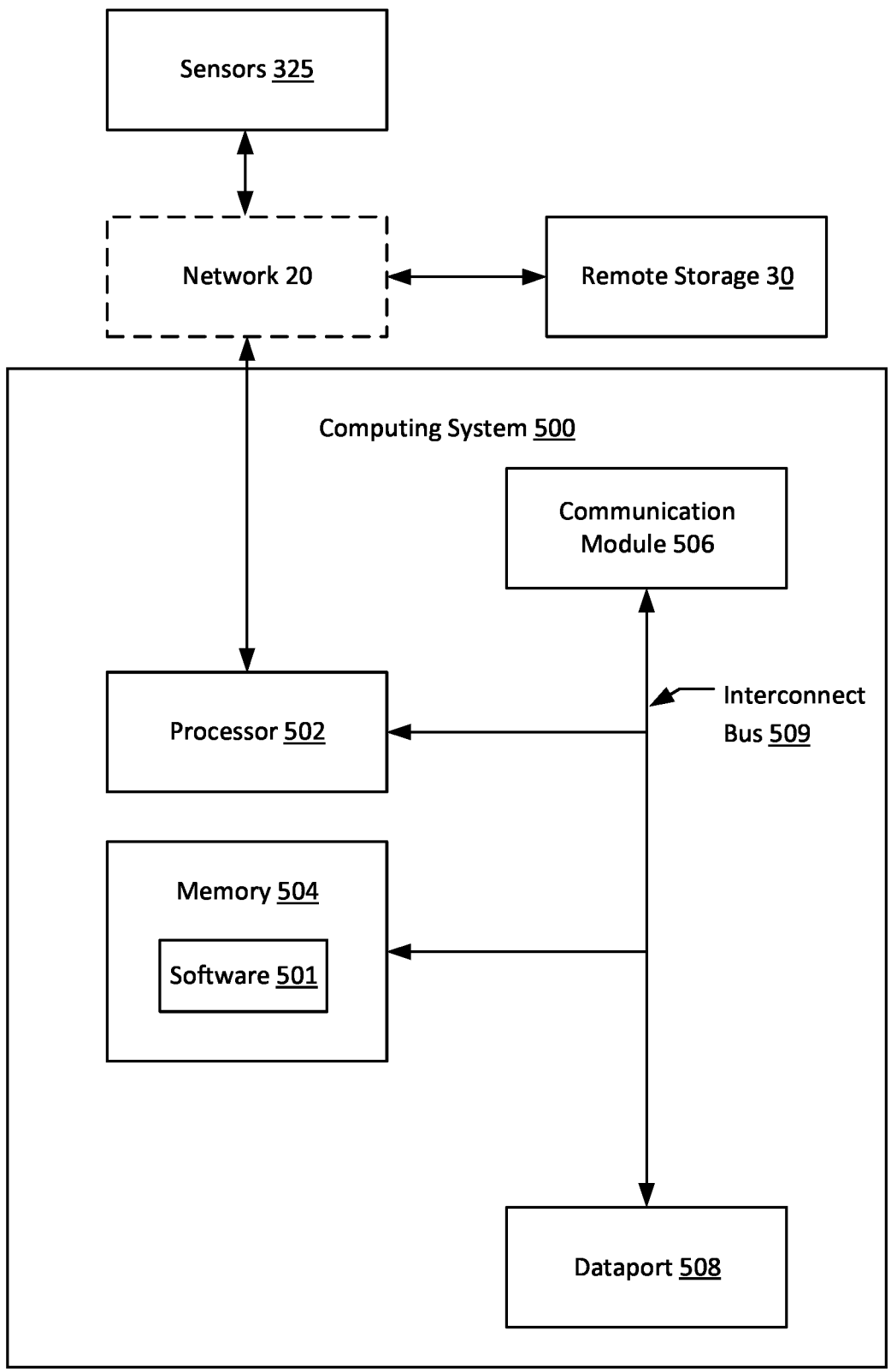
FIG. 3 is a block diagram of a computing system of the automated tank system of FIG. 1.

FIG. 3 is a functional block diagram of the computing system 500 which may be used to implement the various automated tank system embodiments and methods according to the different aspects of the present disclosure. The computing system 500 may be, for example, a smartphone, a laptop computer, a desktop computer, a flexible circuit board, or other computing device whether now known or subsequently developed. In some embodiments, the computing system is housed at least in part within one or more of the separators 120. The computing system 500 comprises a processor 502, memory 504, a communication module 506, and a dataport 508. These components may be communicatively coupled together by an interconnect bus 509 or other appropriate communication devices. The computing system 500 may be physically located with other components of the control unit 400 or may be remotely located.

The processor 502 may include any processor used in smartphones and/or other computing devices, including an analog processor (e.g., a Nano carbon-based processor). In certain embodiments, the processor 502 may include one or more other processors, such as one or more microprocessors, and/or one or more supplementary co-processors, such as math co-processors.

The memory 504 may include both operating memory, such as random access memory (RAM), as well as data storage, such as read-only memory (ROM), hard drives, optical, flash memory, or any other suitable memory/storage element. The memory 504 may include removable memory elements, such as a CompactFlash card, a MultiMediaCard (MMC), and/or a Secure Digital (SD) card. In certain embodiments, the memory 504 includes a combination of magnetic, optical, and/or semiconductor memory, and may include, for example, RAM, ROM, flash drive, and/or a hard disk or drive. The processor 502 and the memory 504 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 502 may be connected to the memory 504 via the dataport 508.

The communication module 506 may be configured to handle communication links between the computing system 500 and other external devices or receivers, and to route incoming/outgoing data appropriately. For example, inbound data from the dataport 508 may be routed through the communication module 506 before being directed to the processor 502, and outbound data from the processor 502 may be routed through the communication module 506 before being directed to the dataport 508. The communication module 506 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, 5G, or any other protocol and/or technology.

The dataport 508 may be any type of connector used for physically interfacing with a smartphone, computer, and/or other devices, such as a mini-USB port or an IPHONE®/IPOD® 30-pin connector or LIGHTNING® connector. In other embodiments, the dataport 508 may include multiple communication channels for simultaneous communication with, for example, other processors, servers, and/or client terminals.

The memory 504 may store instructions for communicating with other systems, such as a computer. The memory 504 may store, for example, a program (e.g., computer program code) adapted to direct the processor 502 in accordance with the embodiments described herein. The instructions also may include program elements, such as an operating system. While execution of sequences of instructions in the program causes the processor 502 to perform the process steps and/or functions described herein, hard-wired circuitry may be used in place of, or in combination with, software/firmware instructions for implementation of the processes of the present embodiments. Thus, unless expressly noted, the present embodiments are not limited to any specific combination of hardware and software.

In the embodiment 10, the memory 504 includes software 501. The software 501 contains machine-readable instructions configured to be executed by the processor 502. The software 501 may, for example, process data obtained from the sensor 375. In embodiments, the software 501 may cause the computing system 500 to dynamically respond to a reading obtained by the sensor 375. For example, the software 501 may direct the valves 350 to redirect fluid flow the diversion tank 200 in response to a sensor 375 determination that the storage tanks 100 have reached a predetermined or "full" level.

The memory 504 may contain a machine learning system or program configured to carry out one or more of the techniques and methods described herein. As an example, a machine learning program may be used by the computing system 500 to recognize various operating conditions of the system 100, and to formulate a response to said detections (e.g., by modifying the value at which the system 10 redirects fluid flow to the diversion tank 200). The machine learning analysis may be provided on behalf of any number of machine learning algorithms and trained models, including but not limited to deep learning models (also known as deep machine learning, or hierarchical models) that have been trained to perform image recognition tasks. Machine learning is used to refer to the various classes of artificial intelligence algorithms and algorithm-driven approaches that are capable of performing machine-driven (e.g., computer-aided) identification of trained structures, and deep learning is used to refer to a multiple-level operation of such machine learning algorithms using multiple levels of representation and abstraction. The artisan will understand that the role of the machine learning algorithms that are applied, used, and configured as described may be supplemented or substituted by any number of other algorithm-based approaches, including variations of artificial neural networks, learning-capable algorithms, trainable object classifications, and other artificial intelligence processing techniques.

The computing system 500 may be in data communication with a remote storage 40 over a network 30. The network 30 may be a wired network, a wireless network, or comprise elements of both. In embodiments, the network 30 may communicatively link one or more components of the flowback monitoring system 100. For example, the sensor 375 may be communicatively linked to the computing system 500 via the network 30 for the exchange of information therebetween. The remote storage 40 may be, for example, the "cloud" or other remote storage in communication with other computing systems. In some embodiments, data (e.g., readings obtained by the sensors 375 and the dynamic responses of the computing system 500 thereto) may be stored in the remote storage 40 for analytics.

Figure 4:
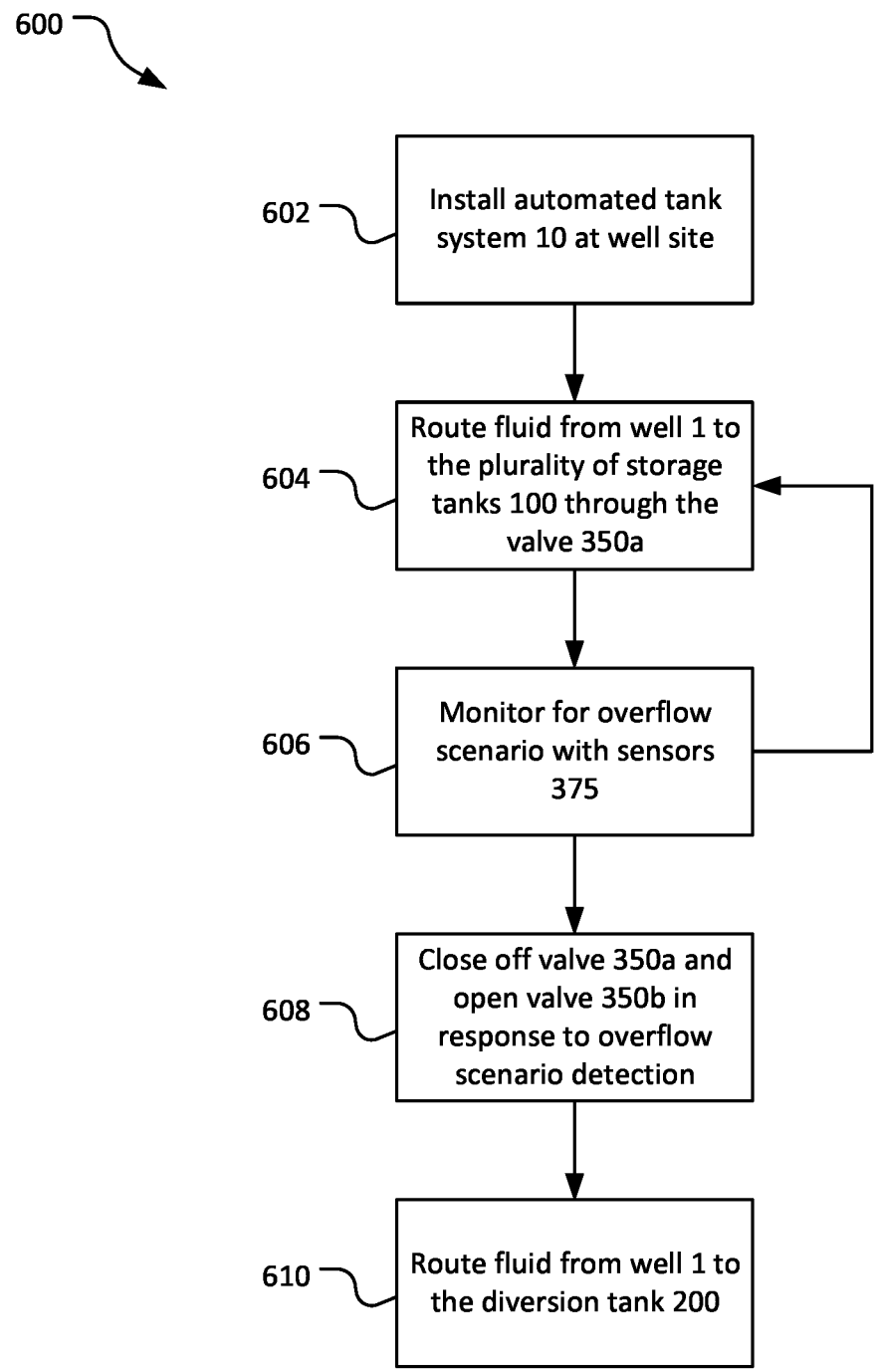
FIG. 4 is flowchart depicting a method of operating the automated tank system of FIG. 1, according to an embodiment.

FIG. 4 is a flowchart depicting a method 600 of operating the system 10, in an example embodiment. First, at step 602, the automated tank system 10 may be installed on the well site. For example, any suitable number of plurality of tanks 100, diversion tanks 200, fill manifolds 300, and control units 400 may be set up at the well 1 site. As discussed above, the control valves 350 and the sensors 375 may be completely external to the tanks 100, 200. Accordingly, the plurality of storage tanks 100 and/or the diversion tank 200 may be left relatively unmodified in installing the control valves 350 and the sensors 375 compared to conventional systems. Next, at step 604, fluid is routed from the well 1, through the manifold lines 325, the control valve 350*a*, and the storage lines 125 to the storage tanks 100. At, step 606, the sensors 375 may monitor the filled volume of the storage tanks 100 for an overflow scenario. If no overflow scenario is detected, the method may repeat the steps 604 and 606 until an overflow scenario is detected. Then, at step 608, after an overflow scenario is detected, the control unit 400 and the valve control system 475 may respond by actuating the control valves 350 to close the valve 350*a* and open the valve 350*b*. With the valves 350 actuated in this way, at step 610, the fluid may be routed from the well 1 through the manifold lines 325, the valve 350*b*, the diversion lines 225, and into the diversion tank 200.

It is to be understood that the steps of the method 600 need not be carried out in the exact order as described, that some steps may occur simultaneously with other steps, and that some steps may be optional, and that each of these combinations of carrying out the method 600 are within the scope of the present disclosure. For example, the steps of routing fluid to the storage tanks (i.e., step 604) and monitoring for an overflow scenario (i.e., step 606) may occur at generally the same time. As another example, the step of setting up the automated tank system 10 (i.e., step 602) may be foregone in situations where the system 10 is already set up at the well site.

Some advantages over existing tank systems may be due to the use of the sensors 375, which may be installed from the exterior of the primary storage tanks at ground level by the user. This easy installation may eliminate the need for personnel to gain access to the top of the tank to install the sensor, either manually or with equipment such as a crane. And this may decrease the risk of harm to the personnel (e.g., due to a fall or other accident) as well as reducing the cost and time it takes to set up the system 10. Furthermore, the system 10 may be installed without the need of a crane to install the sensor 375 or a tank hatch adapter in the top of the tank, thus leaving the tank structure undisturbed (i.e., the tank integrity and pressure relief safety systems would not be compromised by installation of the system 10). Through the use of the control unit 400 and the HMI 475, a user may relatively easily monitor the status of the system 10, and modify the function thereof as desired.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. In some embodiments, steps may be performed in different orders than specifically set forth in the examples herein.

The invention claimed is:

1. A method of storing fluid from an oil well, the method comprising the steps:
   providing a plurality of storage tanks;
   providing a diversion tank;
   coupling a fill manifold to the plurality of storage tanks and to the diversion tank, the fill manifold having a first control valve controlling flow of the fluid to the plurality of storage tanks, the fill manifold having a second control valve controlling flow of the fluid to the diversion tank;
   coupling a sensor externally to at least one storage tank of the plurality of storage tanks without accessing a top of any storage tank of the plurality of storage tanks, the sensor being configured to determine a volume of the fluid within at least one storage tank of the plurality of storage tanks;

associating a control system with the fill manifold and the sensor; and actuating the first and second control valves using the control system in response to at least one detection by the sensor to ensure that the storage tanks are not overfilled;

wherein the first control valve is a butterfly valve; and the step of coupling said sensor to said at least one storage tank of the plurality of storage tanks without accessing said top of said any storage tank further requires the sensor to be mounted via the butterfly valve.

2. The method of claim 1, wherein the diversion tank is a plurality of diversion tanks.

3. The method of claim 1, wherein the plurality of storage tanks are 400 BBL tanks for use with oil and gas extraction operations.

4. The method of claim 1, wherein the first control valve is configured such that fluid is selectively provided to all of the plurality of storage tanks and to none of the plurality of storage tanks.

5. The method of claim 1, further comprising the steps of:
providing an alarm in communication with the control system; and
the control system actuating the alarm upon the control unit determining occurrence of a predetermined condition.

6. The method of claim 1, further comprising an alarm generator in communication with the control system, the alarm generator actuating an output on a cell phone or an internet application to indicate a tank level.

7. The method of claim 1, wherein the plurality of storage tanks are 500 BBL tanks for use with oil and gas extraction operations.

8. The method of claim 1, wherein at least one of the first control valve and the second control valve are pneumatically operated.

9. The method of claim 1, wherein the first control valve and the second control valve are hydraulically or electrically operated.

10. The method of claim 1, further comprising providing a valve control system configured to selectively operate each of the first control valve and the second control valve.

11. The method of claim 1, wherein the sensor is further configured to determine a volume of fluid within the diversion tank.

12. The method of claim 1, wherein the sensor is selected from the group consisting of: a level indicator, a flowmeter, and a pressure sensor.

13. The method of claim 1, further comprising:
providing an alarm generator in communication with the control system; and
actuating the alarm via the control system upon the control system determining occurrence of a predetermined condition.

14. The method of claim 13, wherein the alarm generated by the alarm generator is at least one of an audial indicator and a visual indicator.

15. The method of claim 13, further comprising actuating, via the alarm generator, an output on a cell phone or an internet application to indicate a tank level.

16. The method of claim 13, wherein the predetermined condition is a threshold volume of the plurality of storage tanks.

17. The method of claim 13, wherein the predetermined condition is a threshold volume of the diversion tank.

* * * * *